Feb. 2, 1926.

A. L. BAUSMAN 1,571,365

CONFECTION COATING MACHINE

Filed Jan. 30, 1924

INVENTOR

Alonzo Linton Bausman

BY

ATTORNEYS

Feb. 2, 1926.

A. L. BAUSMAN 1,571,365

CONFECTION COATING MACHINE

Filed Jan. 30, 1924   3 Sheets-Sheet 2

INVENTOR
Alonzo Linton Bausman
BY Chapin T Hial
ATTORNEYS

Feb. 2, 1926.

A. L. BAUSMAN 1,571,365

CONFECTION COATING MACHINE

Filed Jan. 30, 1924    3 Sheets-Sheet 3

INVENTOR
Alonzo Linton Bausman
BY Chapin & Neal
ATTORNEYS

Patented Feb. 2, 1926.

1,571,365

UNITED STATES PATENT OFFICE.

ALONZO LINTON BAUSMAN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS.

CONFECTION-COATING MACHINE.

Application filed January 30, 1924. Serial No. 689,439.

*To all whom it may concern:*

Be it known that I, ALONZO LINTON BAUSMAN, a citizen of the United States, residing at Springfield, in the county of Hampden and State of Massachusetts, have invented new and useful Improvements in Confection-Coating Machines, of which the following is a specification.

This invention relates to improvements in confection coating machines and, more particularly, to improvements relating to the transfer of freshly coated confections from one conveyer of the machine to another.

Generally speaking, the freshly coated confections are carried on the upper stretch of an open work conveyer, such as a wire belt, and transferred automatically to the upper stretch of a delivery conveyer, the receiving end of which is located closely adjacent and at substantially the same level as the delivery end of the first named conveyer. The space between the two conveyers is so small that coated candies of ordinary size cannot fall therethrough and accordingly the candies readily pass from one conveyer to the other automatically and without difficulty.

With very small centers, such as raisins, peanuts and the like, the arrangement, as above set forth, is not satisfactory because it is not feasible, as a practical matter, to make the space between the two conveyers less in length than the smallest dimension of such small centers. The result is that the centers, which are very light and are enveloped with a coating of plastic chocolate, cling to the first conveyer and follow around with the latter in its lower stretch of travel and are not transferred to the delivery conveyer as desired.

This invention is concerned with, and has for an object, the provision of means whereby a satisfactory transfer of coated confections, of the character last described, may be effected.

More particularly it is an object of the invention to provide means for preventing any confections, which follow around with the conveyer to its lower stretch of travel, from passing beyond a predetermined point therewith.

Preferably, such means also performs the function of removing the confections in orderly fashion from the lower stretch of the conveyer and causes them to drop upon a confection receiving means, usually and preferably a delivery conveyer, by means of which the coated confections are carried away, usually to a cooling means.

In carrying out the invention, I employ mechanism for rapping a portion of the lower or return stretch of the first conveyer and arrange the receiving end of the delivery conveyer below such stretch so as to receive the confections as they are removed from the first conveyer by the rapping mechanism.

Other objects and advantages will appear in the following description and in the illustrative embodiment of the invention in the accompanying drawings, in which,—

Referring to these drawings, the invention has been shown as embodied in a well known type of confection coating machine, which includes a casing A, having therein suitable means (not shown) for applying a coating of chocolate or the like to confections carried on a conveyer 10. The latter is of open work construction, usually in the nature of a wire screen which permits excess coating to drip from the confections as they are carried along for transfer to the delivery conveyer 11. The latter may be of any suitable construction and usually has a smooth, waxy surface, impervious to the coating material. Conveyer 11 operates to carry the confections away from the machine to suitable cooling means, such as a cold box or a cold room, for example.

Figure 1:
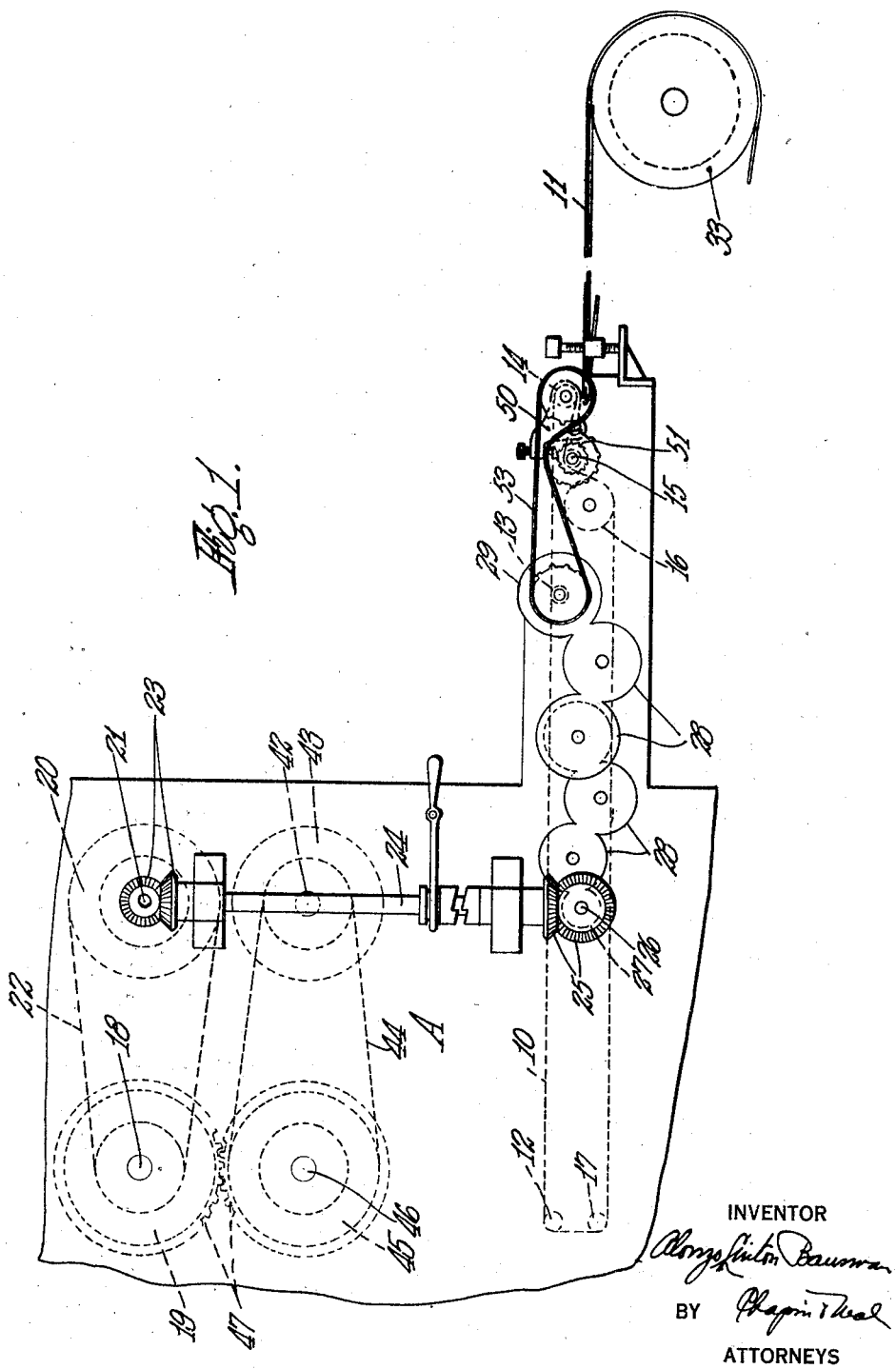
Figs. 1 and 2 are fragmentary front and rear elevational views of a confection coating machine embodying the invention.
Figure 2:
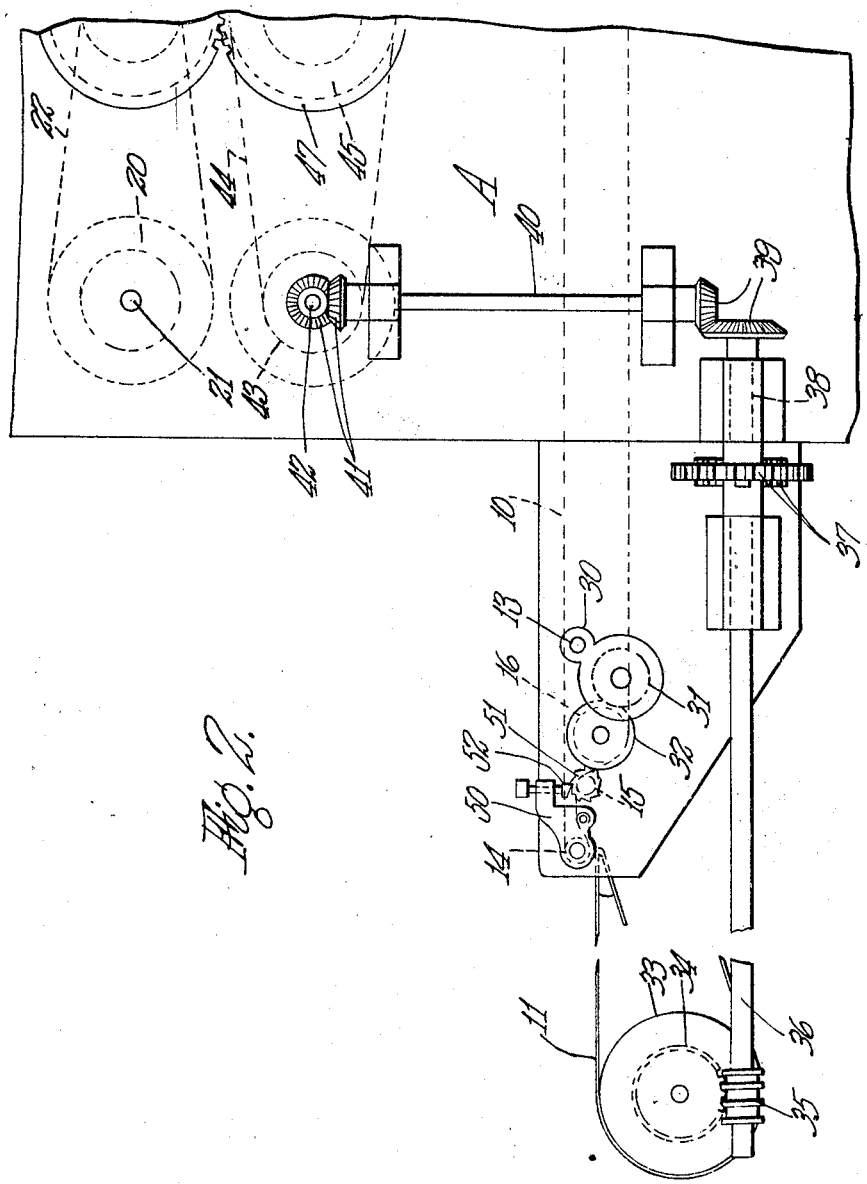
Figure 3:
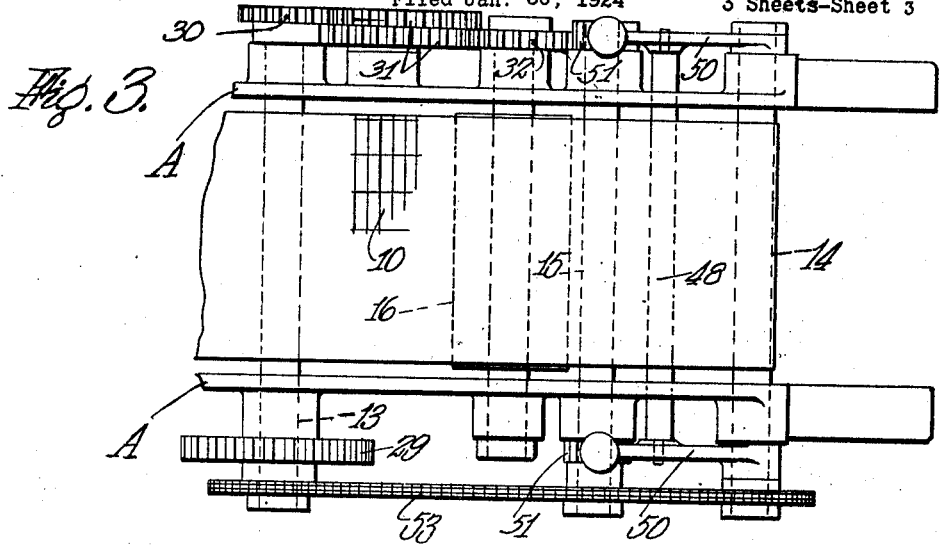
Fig. 3 is a top plan view illustrative of the mounting and drive for the coating belt and the rapping mechanism.

Referring to Fig. 1, the conveyer 10 is suitably supported by, and travels around, a series of rolls, such as 12, 13, 14, 15, 16, and 17, suitably mounted in casing A. The conveyer 10 is driven by the application of power to roll 16 in any suitable way. Ordinarily, however, roll 16 is driven from a power shaft 18 mounted in the upper part of casing A, through the following train of mechanism. A cone pulley 19 on shaft 18 is connected to a similar but reversely arranged pulley 20 on a parallel shaft 21 by a belt 22, the pulleys and belt constituting the usual speed changing device. Shaft 21 drives by bevel gears 23 a vertical shaft 24, which in turn drives by bevel gears 25 a shaft 26 carrying a pinion 27. The latter, through a train of spur gears 28 drives a gear 29 on one end of the shaft 13, above referred to. Referring now to Fig. 2, a pinion 30 is fixed on the opposite end of shaft 13 and drives, through the compound gear 31, a gear 32 fixed on one end of the shaft of roll 16, which, as above described, drives conveyer 10.

The conveyer 11, illustrated largely in conventional form, has a driving roll 33 adapted to be rotated by a worm wheel 34 and worm 35. The latter is fixed to a horizontal shaft 36, which extends to casing A and drives by spur gears 37 a short shaft 38. Shaft 38 is connected by bevel gears 39 to a vertical shaft 40, which, in turn is connected by bevel gears 41 to a shaft 42. The latter carries a cone pulley 43 which is connected by a belt 44 to a similar but reversely arranged pulley 45 on a shaft 46, which underlies shaft 18 and is driven therefrom by spur gears 47.

The particular style of coating machine, above described, is given merely as an illustrative example of one of many suitable types in which the invention may be embodied and the details of the machine are not essential to the invention which is more particularly concerned with the transfer of the coated goods from the wire belt 10 to the delivery belt 11.

Figure 4:
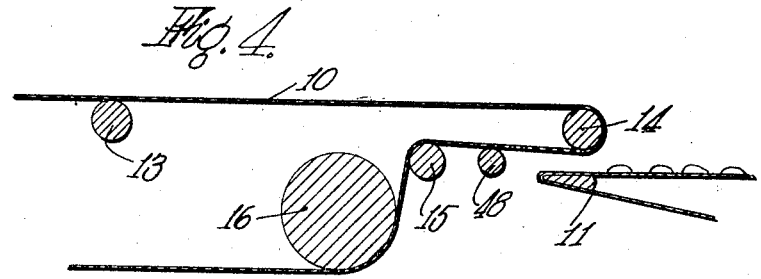
Fig. 4 is a fragmentary, sectional elevational view illustrative of the manner in which confections are transferred from the coating belt to the delivery conveyer.

The belts 10 and 11 ordinarily have their upper, and confection carrying, stretches of travel in a common plane. Also, the roll 14 is disposed much nearer roll 16 so that belt 10 passes nearly vertically downward and directly to roll 16. According to this invention, roll 14 is removed to a substantial distance beyond roll 16 and the belt 10, in the initial stages of its return stretch, travels horizontally and closely adjacent the upper stretch until it meets a supplementary roll 15, over which the belt passes to roll 16 and thence to roll 17 along the normal level of the return stretch. The delivery conveyer 11, at least at its receiving end, is at a lower level than the confection supporting stretch of belt 10 and instead of having the delivery end of the latter as closely as possible to the receiving end of belt 11, the belts are made to overlap and belt 11 to underlie belt 10 in the initial stages of its return stretch, all as shown in Fig. 4.

Figure 5:
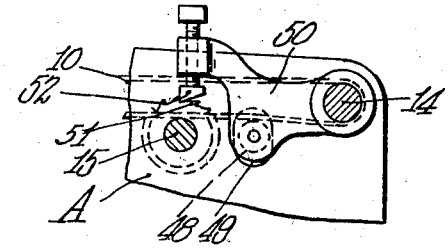
Fig. 5 is an enlarged, fragmentary, elevational view of the rapping mechanism.

Underlying that portion of the return stretch of belt 10 which lies between rolls 14 and 16 is a cross member 48, preferably in the nature of a roll, and this member is vibrated in such a manner as to tap the belt and jar loose therefrom such confections as travel around with belt 10 in its lower stretch of travel. This roll 48 extends through slots 49 (Fig. 5) in the side walls of casing A and is rotatably supported at its ends by and between a pair of arms 50, pivotally supported on shaft 14 near opposite ends thereof and outside the casing A. Fixed on shaft 15, one near each end thereof, are ratchets 51 and engaged therewith are pawls 52, adjustably mounted, as by the screw threads illustrated, in arms 50. The shafts 14 and 15 are driven from shaft 13 by a chain 53 and suitable sprockets, as shown in Fig. 1.

In operation, the coated confections carried on belt 10, in the upper stretch of travel thereof, tend, by reason of their light weight and their coating of plastic chocolate, to cling to the belt and travel around roll 14. On account of this tendency and the practical difficulty of getting the receiving end of belt 11 close enough to the delivery end of belt 10 to prevent such action, when very small centers are used, the confections are purposely allowed to travel around roll 14. Then, since that section of belt 10, travelling between rolls 14 and 15, is vibrated, the confections are knocked off the belt and allowed to drop upon the delivery belt 11, or any other suitable confection receiving means. The location of the rapping device is advantageous in that the action of gravity on the confections is brought into play to assist in their removal. The confections, which necessitate the provisions of this invention, are such that their inversion in the transfer from one belt to another does not matter. That is, they may be supported from one side as well as another and do not have merely one suitable supporting face, as is the case with the ordinary, more or less conical-shaped, chocolate cream.

The invention has been disclosed herein, in an embodiment at present preferred, for illustrative purposes but the scope of the invention is defined by the appended claims rather than by the foregoing description.

I claim:

1. In a confection coating machine, a conveyor on the upper stretch of travel of which freshly coated confections are carried and to which the latter cling as the conveyor passes to its lower stretch of travel, whereby the coated articles hang upside down from the conveyor as it enters its lower stretch of travel, conveying means in part underlying said stretch to receive the confections therefrom, and means for successively removing the confections from said conveyor when the latter arrives at a predetermined point in its lower stretch of travel, and causing them to fall upon said conveying means in substantially the same sequence and arrangement in which they were carried by said conveyor.

2. In a confection coating machine, a conveyor on the upper stretch of travel of which freshly coated confections are carried and to which the latter cling as the conveyor passes to its lower stretch of travel, whereby the coated articles hang upside down from the conveyor as it enters its lower stretch of travel, conveying means in part underlying said stretch to receive the confections therefrom, means for rapping said conveyor in its return stretch of travel to successively remove the confections therefrom, and means for confining the rapping of said conveyor to a relatively small area to cause the confections to fall therefrom at a predetermined point so that the confections fall upon the conveying means in substantially the same sequence and arrangement in which they were carried by said conveyor.

3. A confection coating machine, comprising, pervious conveying means mounted to present an upper and substantially horizontal stretch of travel and adapted to carry articles laid thereon in under the coating flow, said means being mounted to enter its return stretch of travel while the coatings applied to the articles are still plastic and workable, said articles being relatively small and light enough so that they are held to the conveyor by the adhesion of their coatings and carried therewith into the return stretch of travel, conveying means in part underlying said return stretch of travel and supplied with a smooth impervious surface, and means for successively removing the coated confections while their coatings are still plastic and workable when they reach a predetermined point in said return stretch of travel, whereby the confections fall upon said smooth surface and the plastic coatings settle thereupon to form flat bottoms for the coated confections.

In testimony whereof I have affixed my signature.

ALONZO LINTON BAUSMAN.